United States Patent [19]
Gulden, Jr. et al.

[11] Patent Number: 5,099,438
[45] Date of Patent: Mar. 24, 1992

[54] METHOD FOR ON-LINE MONITORING AND CONTROL OF THE PERFORMANCE OF AN ELECTRIC ARC FURNACE

[75] Inventors: George Gulden, Jr., Lyndhurst; Kenneth W. Penkal, Medina, both of Ohio

[73] Assignee: Ucar Carbon Technology Corporation, Danbury, Conn.

[21] Appl. No.: 398,968

[22] Filed: Aug. 28, 1989

[51] Int. Cl.$^5$ ................. G01N 27/00; G05B 13/00
[52] U.S. Cl. ................................ 364/550; 373/104; 364/506
[58] Field of Search ............... 364/550, 551.01, 505, 364/506, 514; 373/1, 2, 102, 104, 105, 106; 370/99; 340/870.01, 870.17, 521, 534, 825.29, 825.50, 825.53, 825.08

[56] References Cited
U.S. PATENT DOCUMENTS

| | | | |
|---|---|---|---|
| 3,660,583 | 5/1972 | Takanasi et al. | 373/104 |
| 3,988,545 | 10/1976 | Kuemmerle et al. | 370/99 X |
| 4,296,269 | 10/1981 | Stewart et al. | 373/104 |
| 4,517,468 | 5/1985 | Kemper et al. | 364/551.01 X |
| 4,607,374 | 8/1986 | Inagaki et al. | 373/104 |
| 4,901,247 | 2/1990 | Wakimoto et al. | 364/513 |

Primary Examiner—Joseph L. Dixon
Attorney, Agent, or Firm—E. Lieberstein

[57] ABSTRACT

A method for on-line monitoring and/or control of an electric arc furnace utilizing a method of data transfer between a programmable logic controller and a microprocessor comprising monitoring data from the furnace over a fixed time cycle, assigning data values to the monitored data during such time cycle, dividing the fixed time cycle into a multiple of N time subintervals, dividing the data values into data subsets, assigning designated time subintervals to each of the data subsets, transmitting data to the microprocessor in each time subinterval to execute program code corresponding to the data subset in such time subinterval and calculating control factors from the transmitted data for providing control information.

3 Claims, 10 Drawing Sheets

METHOD FOR ON-LINE MONITORING AND CONTROL OF THE PERFORMANCE OF AN ELECTRIC ARC FURNACE

FIELD OF THE INVENTION

This invention relates to electric arc furnaces and, more particularly, to an improved process to monitor and/or control electric arc furnaces.

BACKGROUND OF THE INVENTION

For many years, electric arc furnaces have been operated by manually controlled relay panels. As a result of competitive pressures and a desire to improve the control of arc furnaces, programmable logic controllers (PLC's) have slowly been replacing the relay panel controllers. A PLC enables continuous on-line monitoring of various furnace conditions and also serves as an input processor for higher level main frame computers which perform the heavy-duty data processing for on-line control. PLC's are generally configured to withstand the rigors of the furnace area environment, but are limited in their data processing and memory capabilities. To date, the PLC and the higher level main frame computers have performed discrete hierarchial tasks. The data processing main frame computer capabilities and the front end data collection capabilities of the PLC are integrated in a system adapted to be located on the factory level in the industrial environment of a steel mill for operation in accordance with the present invention to monitor and/or control the operation of the furnace.

The present invention employs an arc furnace monitoring system including one or more conventional PLC's and one or more conventional data processing microcomputers. The PLC's function is to perform high speed data collection of electrical, mechanical, and physical parameters of the furnace, such as, but not limited to, pulse rates from watt/var, current and potential transducers, transformer tap positions, arc length settings, hydraulic variables, positions of mechanical furnace components, and scrap charge weights and present the collected data to the data processing microcomputer in a usable format.

The present invention utilizes conventional microcomputers to receive through a high speed interface the data transmitted by the PLC in a cost effective manner and provide the operator with control information corresponding to the above identified variables by way of reports, displays and/or commands. The key to this invention consists of the integration of the PLC(s) and microcomputer(s) and the method of information handling to provide on-line data collection and data communication between the programmable logic controller and the data processing microcomputer in a stand alone unit for control of the furnace.

Accordingly, it is an object of this invention to provide an improved process to monitor and control an electric arc furnace in the manufacture of steel. It is another object of this invention to provide a stand alone on-line arc furnace monitor and control system which employs commercially available PCL's and microcomputers and eliminates the need for higher level computers.

It is still a further object of this invention to provide the operator of the furnace with process and control information and/or process commands to enable him to control the chemistry and slag characteristics of the furnace operation and more accurately predict when to charge additional scrap steel into the furnace. This, in turn, results in a more efficient utilization of the electric arc furnace.

SUMMARY OF THE INVENTION

The method of the present invention for monitoring and controlling an arc furnace employs a system which includes one or more small PLC's and one or more small data processing microcomputers. The microcomputers include all operator interfaces.

The processing system monitors the operating conditions of an electric arc furnace in an effort to increase the efficiency of producing steel by; providing better control of the electrical energy required, providing better control of the consumable materials (i.e. electrodes, oxygen, etc.), providing better control of good steel making practices in operating the furnace (i.e. deep foamy slag, minimum furnace to caster delays, etc.), and providing quality control records of the entire process and the process parameters.

The processing system employs a method of data transfer which enables it to perform on-line monitoring of the arc furnace using a programmable logic controller and a microprocessor as a stand alone unit. The method comprises:

(a) monitoring data pulses from the arc furnace representative of the electrical energy consumption of the furnace over a fixed time cycle;

(b) converting said pulses into a data value representing the rate of power transmission during such time cycle;

(c) monitoring all analog data signals other than electrical pulses such as hydraulic flow rates and all digital signals corresponding to furnace status and/or conditions and assigning a data value for each such signal during such time cycle;

(d) dividing said fixed time cycle into a multiple of N time subintervals;

(e) arranging said data values into data subsets;

(f) assigning designated data subsets to each of said subintervals;

(g) transmitting data to said microprocessor in each time subinterval in accordance with a predetermined sequence for executing program code corresponding to the subset of variable data in such time subinterval; and (h) calculating control factors from the transmitted data for providing control information to optimize the furnace operation.

A method is also provided for on-line control of an electric arc furnace in the manufacture of steel using a data processing system for providing control information to control the electric arc furnace comprising the steps of:

(a) monitoring electrical data from the arc furnace representative of the electrical conditions and electrical power delivered to the furnace;

(b) calculating a Stability Factor (SF) from said electrical data in accordance with the following algorithm:

$$\text{Stability Factor} = 200 - \frac{\text{(Operating Reactance)}}{\text{(Short Circuit Reactance)}} * 100$$

Where:

$$\text{Operating Reactance} = \frac{\text{measured Megavars}}{3 \text{ (Electrode Current (calculated))}^2}$$

-continued $$\text{Electrode Current (calculated)} = \frac{MVA}{3^{\frac{1}{2}} * V_{\text{primary}}} * N$$

Short Circuit Reactance = Constant which is derived by submerging the electrodes into the liquid steel bath and making the following calculation:

$$\text{Reactance (at short circuit)} = \frac{Megavars}{3 * Current^2 * N^2}$$

Where:
Megavars = measured primary reactive power;
Current = measured average primary current
N = transformer voltage ratio (c) comparing said calculated Stability Factor with a preestablished Stability Factor for said furnace operation corresponding to a given period of furnace operation; and (d) introducing raw material into the furnace when the calculated Stability Factor is below the preestablished level for said period of furnace operation to raise the Stability Factor to said preestablished level.

DETAILED DESCRIPTION OF THE INVENTION

Figure 1:
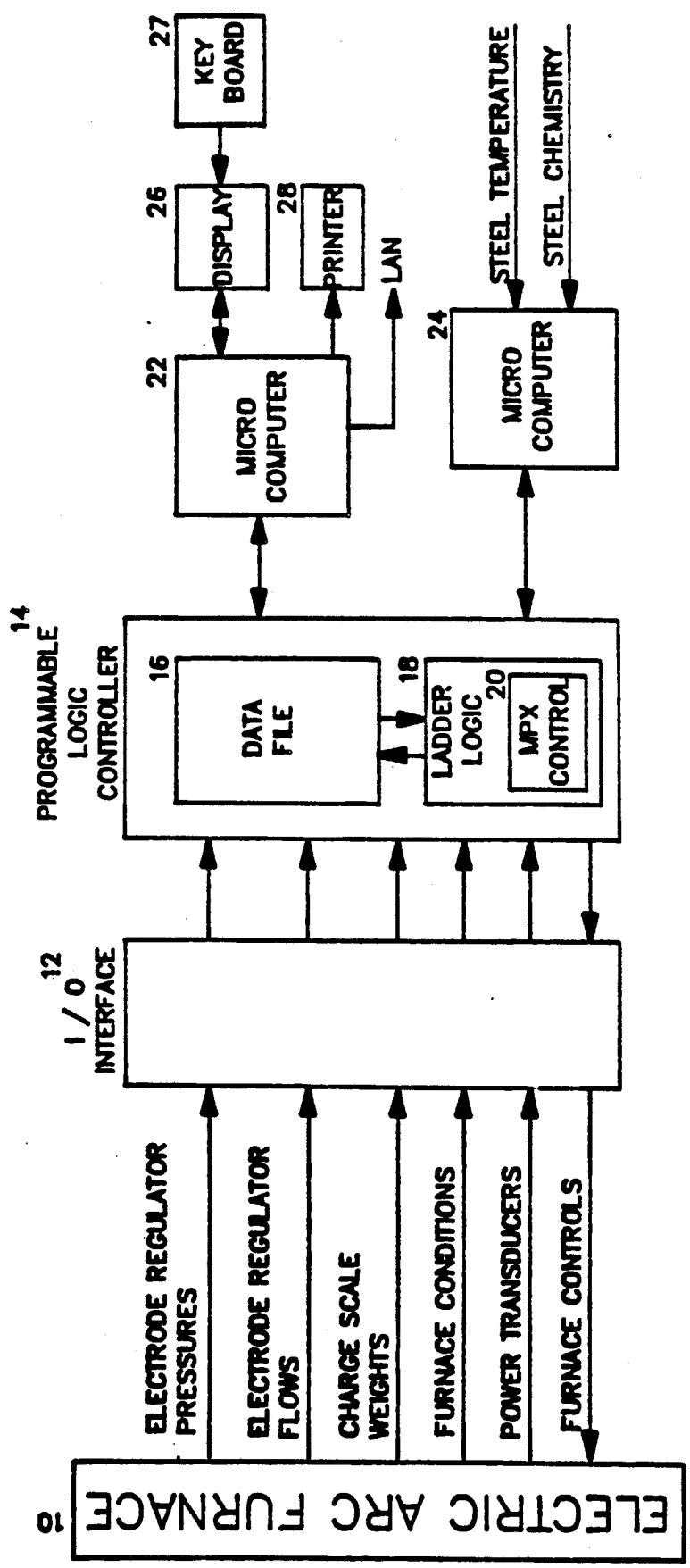
FIG. 1 is a functional block diagram of an arc furnace monitor and control system in accordance with the invention.

Referring now to FIG. 1, Arc Furnace System 10 is of the conventional three electrode type and is provided with the standard complement of controls, sensors and indicators (not shown). The major categories of sensed phenomena are shown as inputs to I/O Interface 12. Those inputs include, but are not limited to, electrode regulator pressures and flows, various scale weights, furnace conditions and furnace electrical information. A plurality of outputs are provided for various furnace control functions.

I/O Interface 12 conditions and provides all of those signals for storage into PLC 14, on a continuing basis. PLC 14 contains a Data File 16 which has an allocated storage area for each indication received from I/O Interface 12. The operation of Data File 16 is controlled by Ladder Logic 18.

The operation of PLC 14 is essentially that of a sophisticated input/output buffer; receiving all indications from I/O Interface 12 on a continuing basis; sampling and storing each; and periodically and selectively transferring information to Microcomputer 22. Microcomputer 24 receives melt temperatures and chemistry inputs and provides calculating capability to derive control signals which are correspondingly put to data file 16 for the arc furnace. Microcomputer 22 also calculates performance factors from accumulated data and provides control signals through PLC 14 to associated furnace controls. Microcomputer 22 further integrates Display 26, Keyboard 27 and Printer 28. Display 26 provides the heat supervisor with both a continuing indication of critical measured values monitored during the heat and is accompanied by a Keyboard 27 which provides the supervisor with an input capability to the system. Printer 28 provides various heat, shift and daily summary reports. Microcomputer 22 may also be connected to a local area network so that its accumulated data can be fed to a higher level computer for data base updating and further report generation. The microcomputers 22 and 24 are conventional microcomputers.

The Ladder Logic 18 operates to continuously sample the various inputs from I/O Interface 12 and to update the values stored in the corresponding memory areas of Data File 16. In other words, each allocated memory position in Data File 16 is periodically overwritten with new data, so that there is always an indication of the most recent measurement in each memory position.

The primary function of PLC 14 is to process all data received through the I/O Interface 12 during a time cycle. The data received and processed by PLC 14 includes, but is not limited to, pulse strings representing the furnace's electrical energy consumption, analog and digital signals representing furnace status and/or condition, and timing values representing the duration or absence of an event or delay. The processing of all received data is accomplished by monitoring the incoming data over a fixed time cycle and converting the data into data sets or values representing e.g. appropriate engineering units. An example of such data processing would be the metering of incoming electrical pulses and conversion of such rate into kilowatt hours, analog signals into data values corresponding to hydraulic flow rates and pressures, and digital signals into data values representing discrete furnace conditions, (i.e. roof open), or scale readings. In addition to data collection and processing, the PLC 14 must further transmit the processed data to Microprocessor 22.

Figure 2:
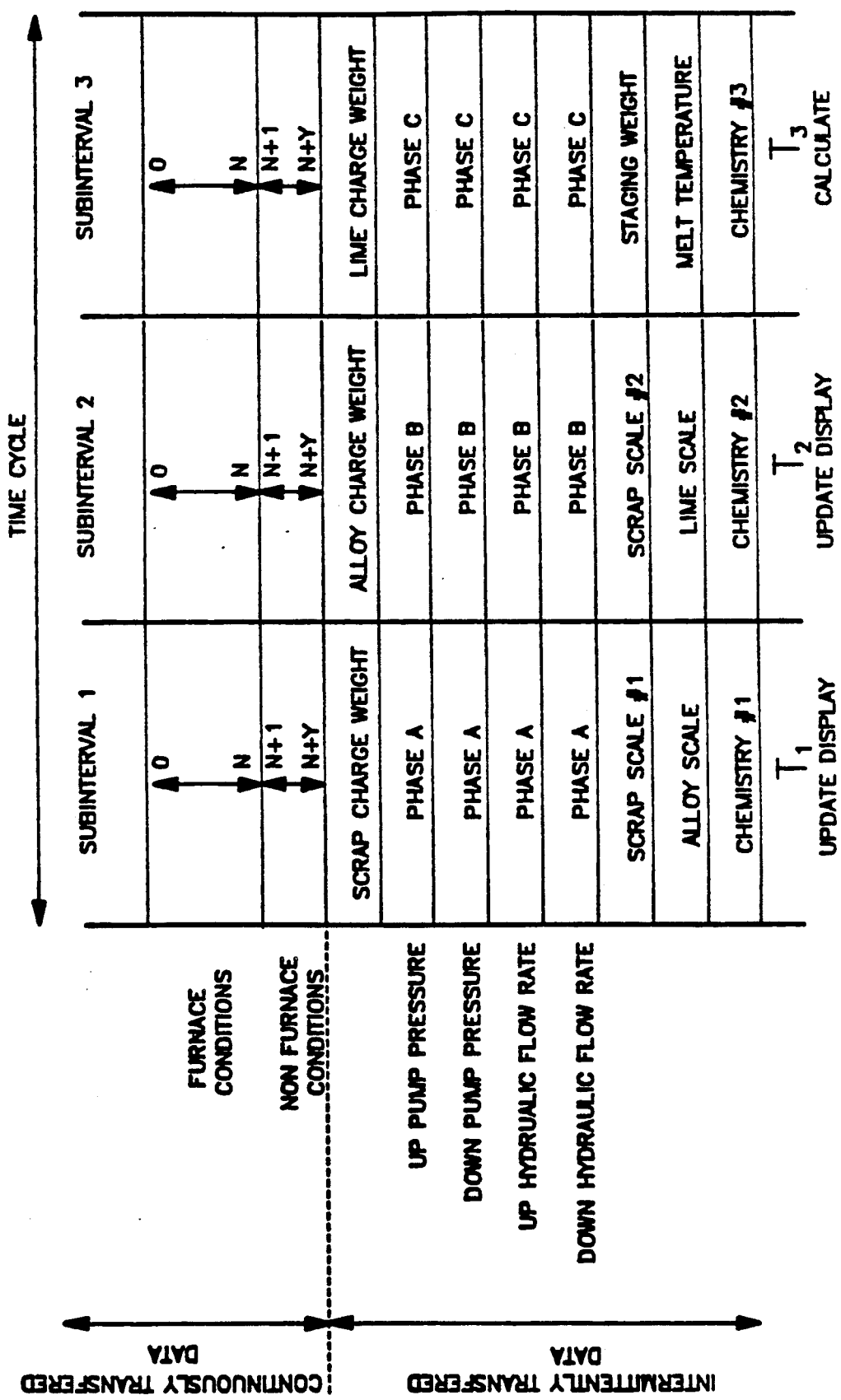
FIG. 2 is a chart which indicates various arc furnace parameters which are monitored and transmitted to the control processor.

To limit the number of data words transferred from PLC 14 to Microcomputer 22, and thus reduce the total transmission time, a multiplexing algorithm is utilized. The algorithm, which is evoked by PLC 14, provides the functions of dividing a fixed time cycle into subintervals of time and allocating transfer locations in the data file 16 for the data values to be transferred during the subintervals of time within the time cycle. The algorithm further arranges the data values into data subsets, preferably of about the same size, corresponding to a given number of time subintervals within the time cycle. Datum from each subset is then selectively assigned to a transfer location during an appropriate time subinterval. A portion of the processed data is continuously assigned to selective transfer locations and transferred throughout the entire time cycle. This is to say certain transfer locations always contain the same data variable, however the data content of these locations may change in each time subinterval. Other processed data is intermittently assigned and transferred so that transfer locations change data variable as well as content during each time subinterval. No data is transferred until the entire subset has been assigned a location for transfer. The subsets of data, the time subinterval in which they are transferred, and a partial list of the data each contains is shown in FIG. 2.

Upon receipt of valid data, the Microcomputer 22 executes program code which performs data accumulation as well as calculation. The accumulations represent a current history of furnace conditions and may be further utilized to calculate certain furnace control factors. Two such furnace control factors, Minutes to Back Charge and Stability Factor are detailed on pages 14 and 15 respectively. Both of these factors provide the operator with timely information which may require operator action or furnace adjustment to control the operation of the furnace and/or to optimize furnace operation.

To expedite the execution of the program code in the Microcomputer 22, the software selectively executes only the portion of program code which pertains to the subset of variable data transferred during the present time subinterval. Each execution of the subintervals program code contains a portion of common code which is therefore executed once during every time subinterval. The execution of each subinterval's program code, as well as the common code, is completed before the expiration of the present time subinterval in which it is executing.

The described data transfer protocol is controlled by software in PLC 14. PLC 14 provides instructions to Microcomputer 22 which enable the microcomputer 22 to receive and process the various categories of data indicated in FIG. 2. Multiplex control 20 controls the output data to Microcomputer 22.

Figure 3:
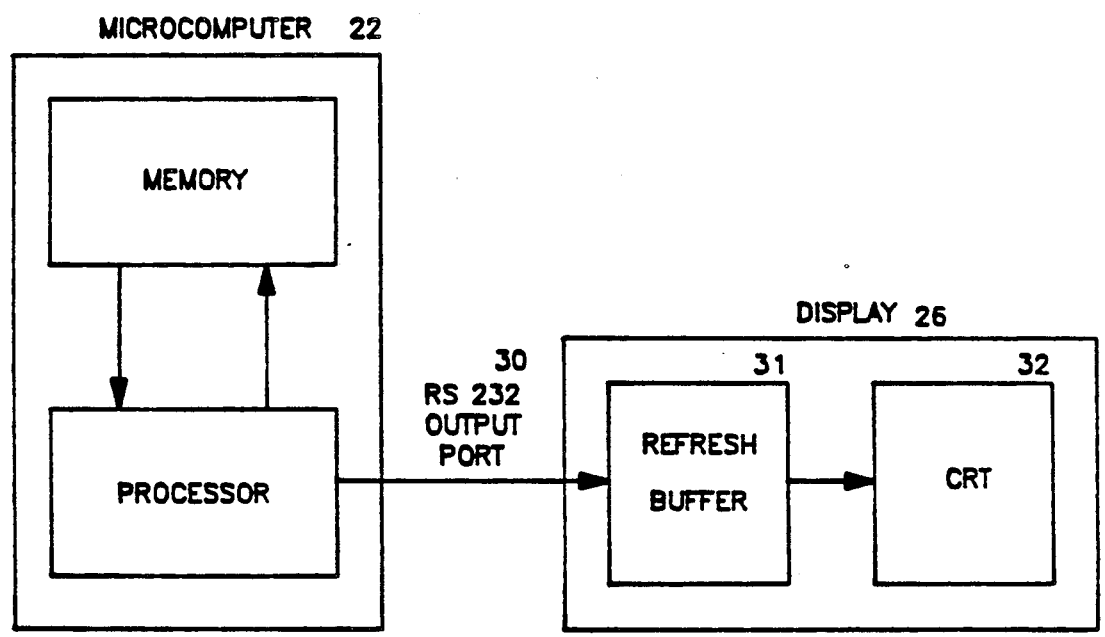
FIG. 3 is a high level block diagram showing the interconnection between a microcomputer and a display.

Referring now to FIG. 3, a high level block diagram is shown of Microcomputer 22 and its interconnection with Display 26. Microcomputer 22, in its commercially available configuration, has a serial RS232 data port 30 for communicating with refresh Buffer 31 in Display 26. The data transfer capabilities of Microcomputer 22 do not enable, within a single refresh cycle, the transfer of sufficient data to refresh Buffer 31 to enable complete update of a screen viewed on CRT 32. To overcome this problem, the screen data update from Microcomputer 22 is segmented, in much the same way, as the input data to Microcomputer 22 from PLC 14. In specific, Microcomputer 22 only transmits during one subinterval a portion of the refresh data for Display 26. It then subsequently transmits the remaining update data during a subsequent subinterval so that over two subintervals the entire screen is updated, reference FIG. 2. All data required for screen refresh is calculated during the last time subinterval of the previous time cycle.

Figure 4A:
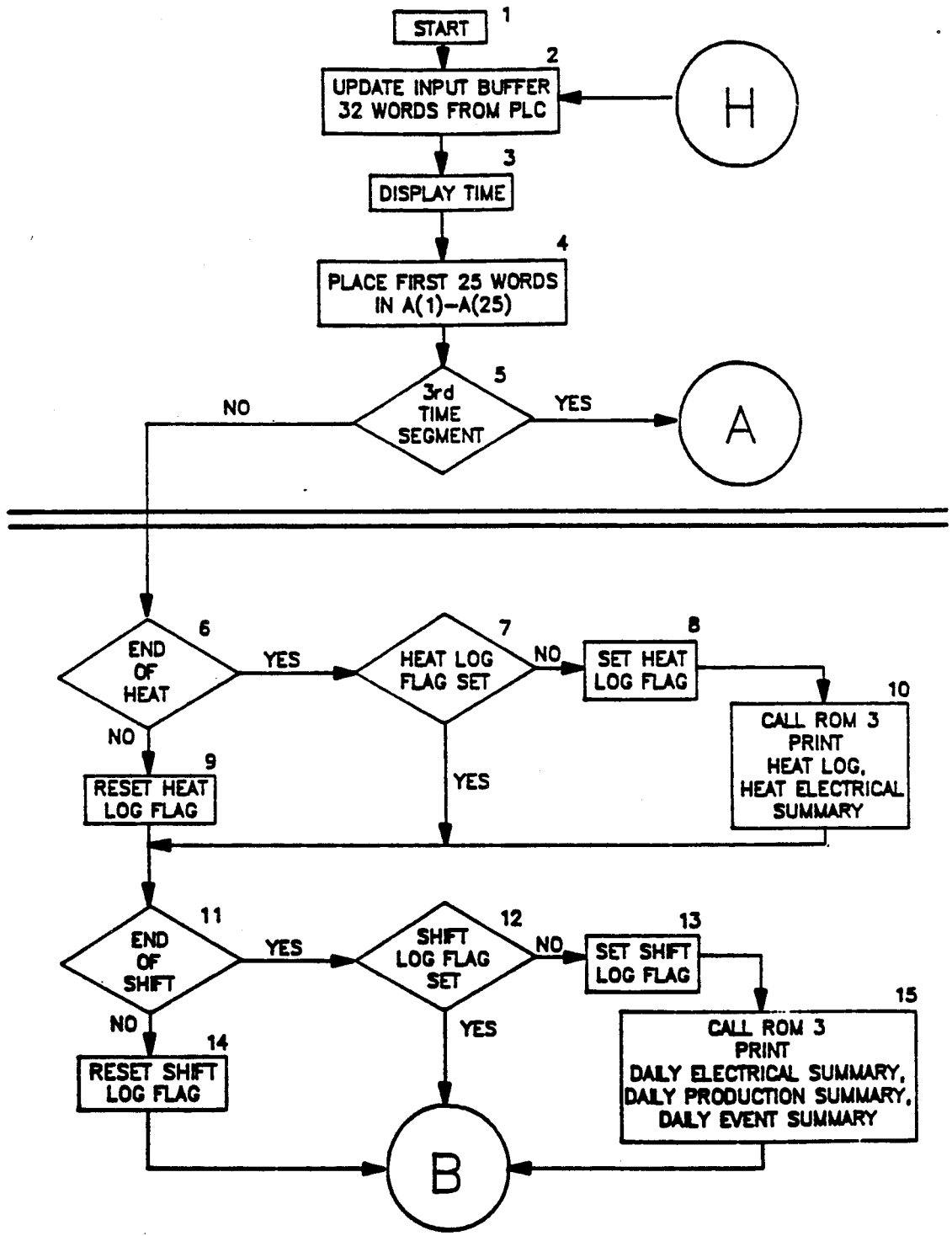
FIGS. 4a-4g illustrate a high level flow diagram for the system of FIG. 1.
Figure 4B:
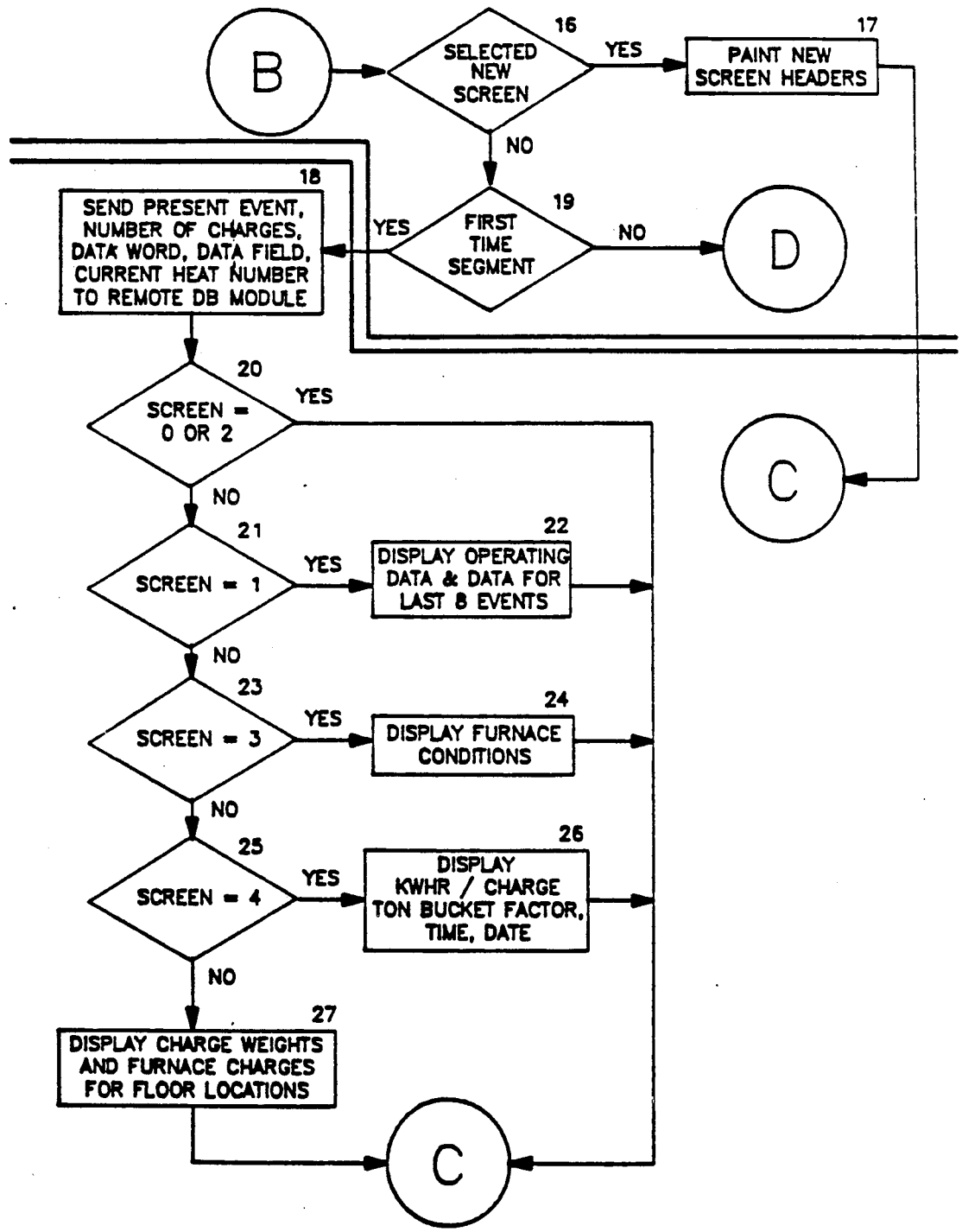
Figure 4C:
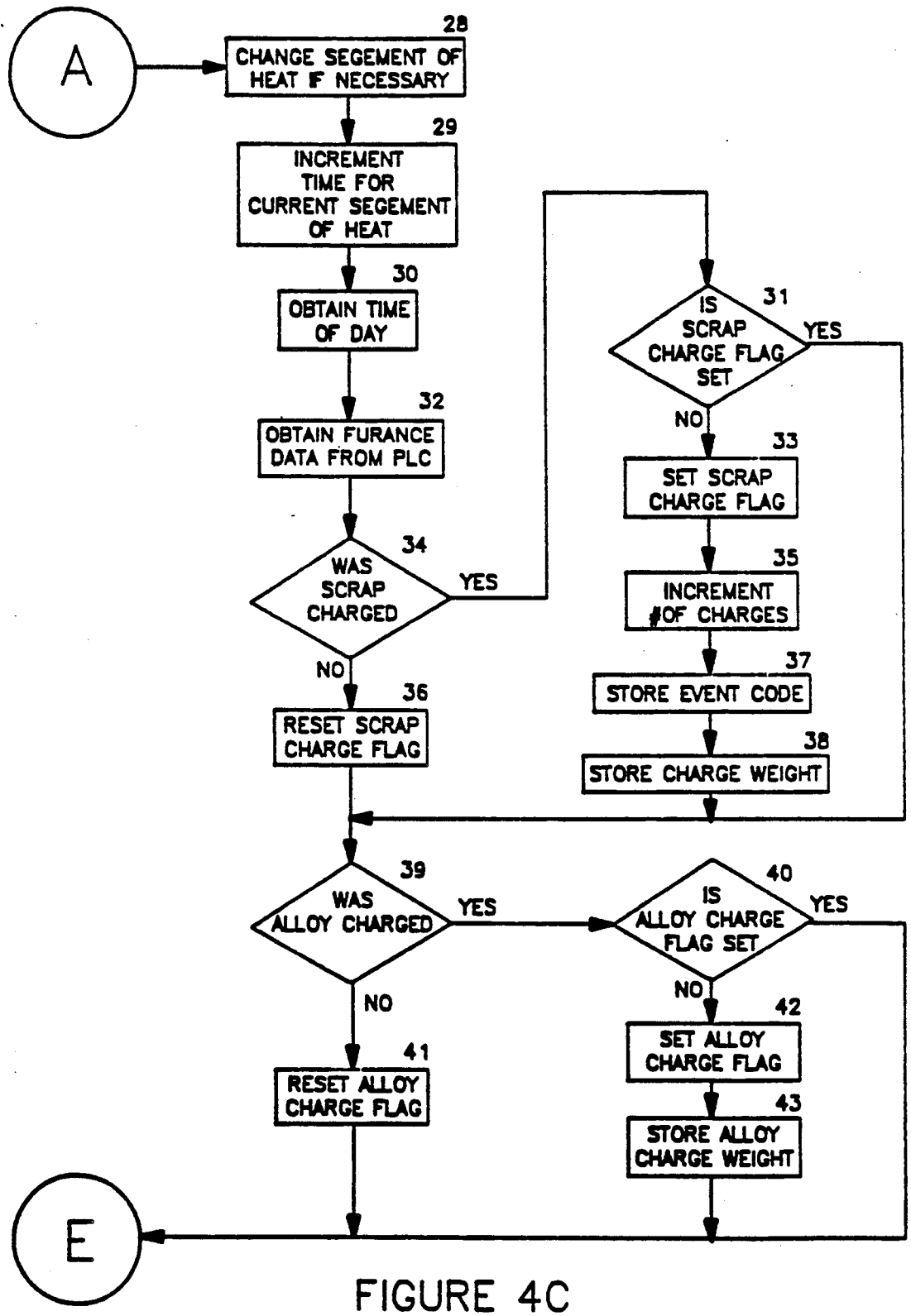
Figure 4D:
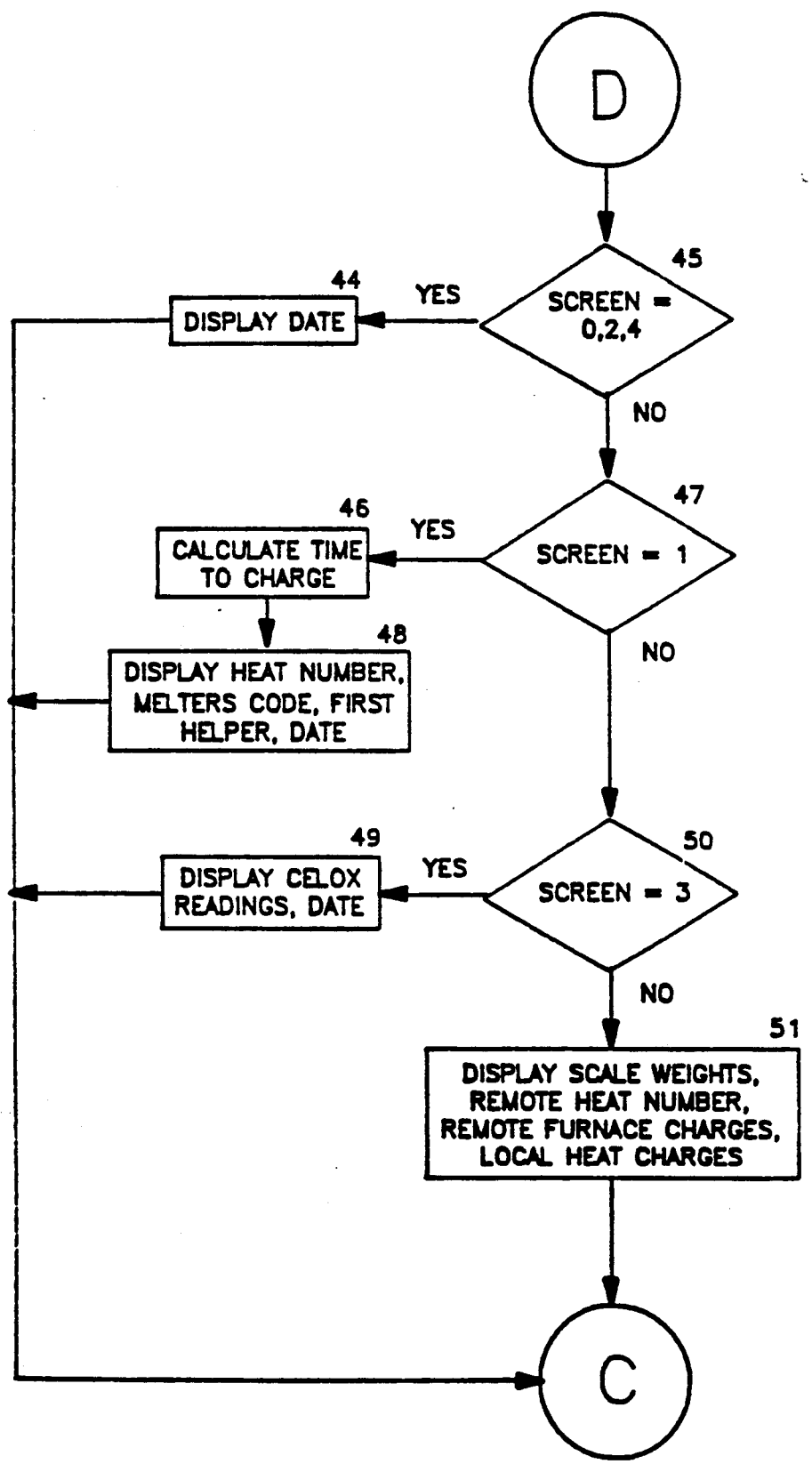
Figure 4E:
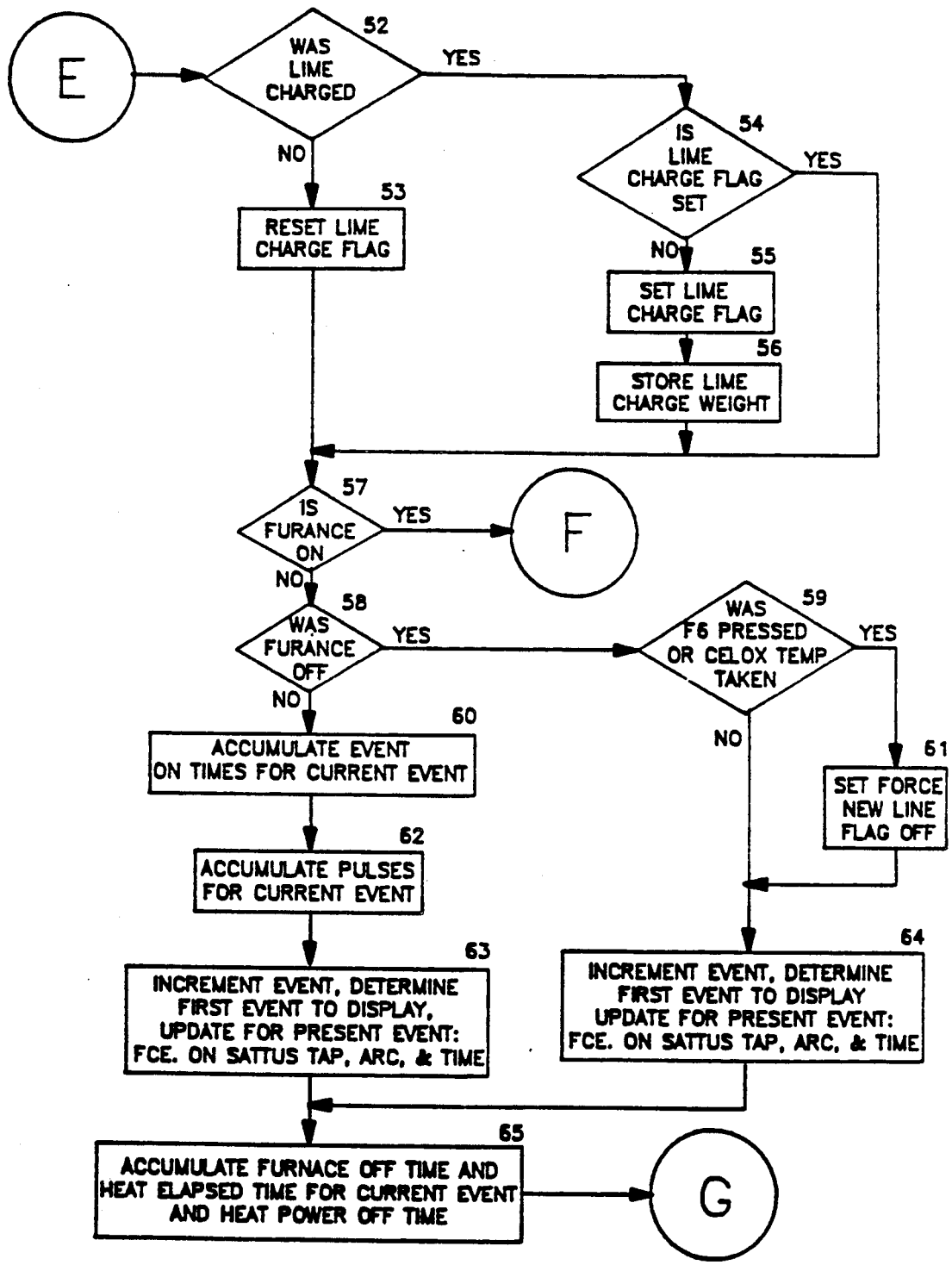
Figure 4F:
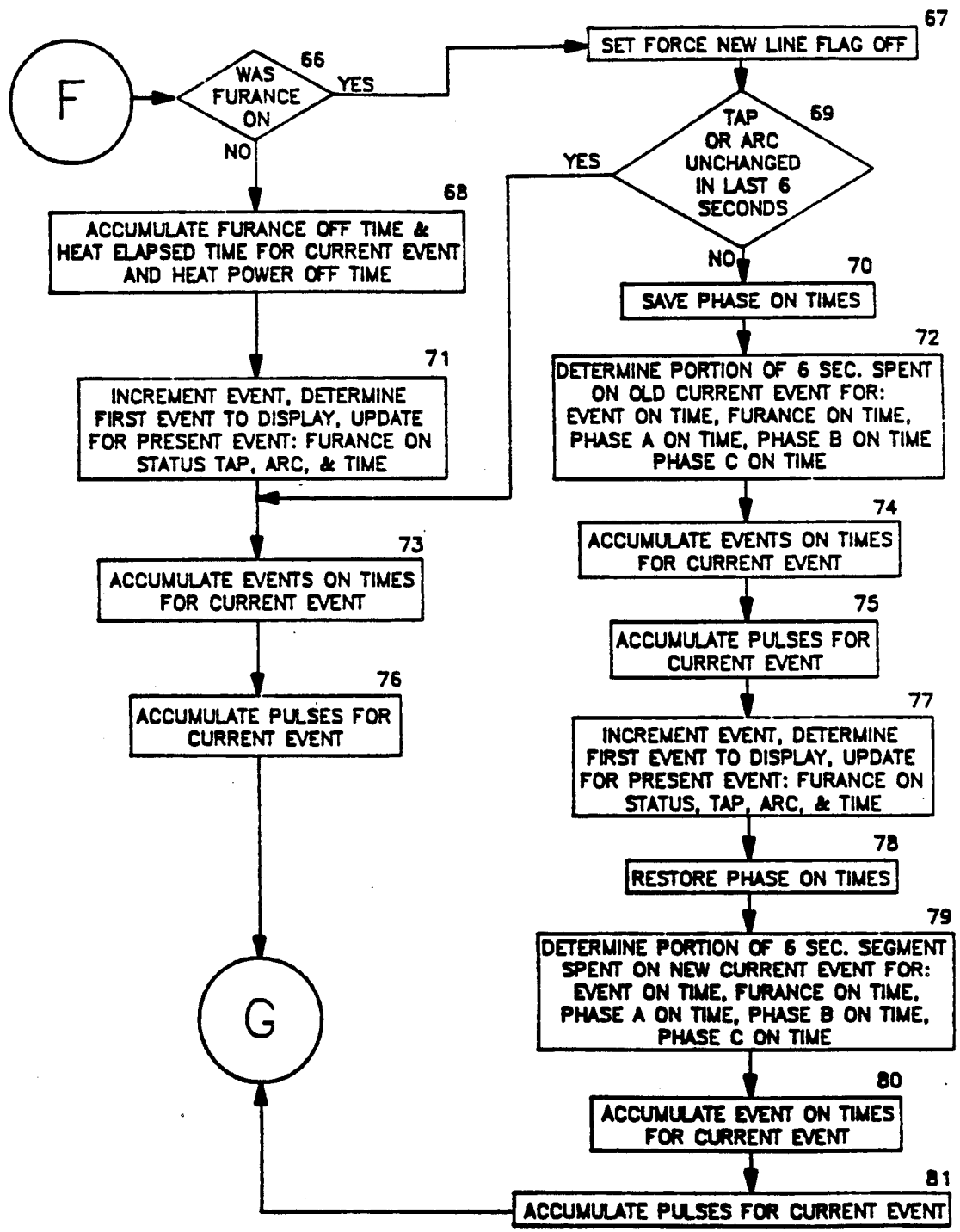
Figure 4G:
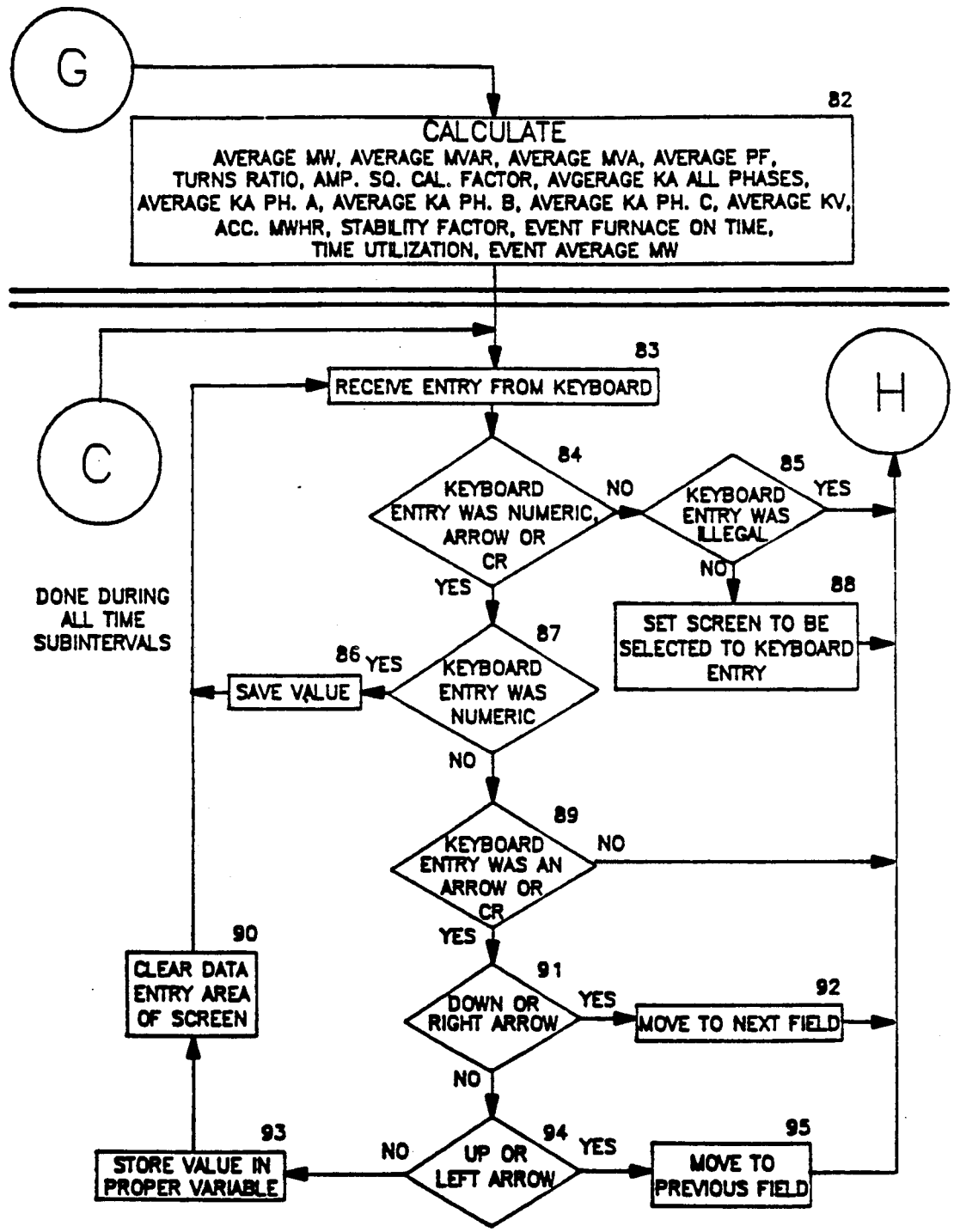

Referring now to FIGS. 4A-4G, a high level flow diagram illustrates the operation of software within Microcomputer 22 and its control of PLC 14, Display 26 and Microcomputer 22. As indicated in FIG. 4A, Microcomputer 22 obtains data from PLC 14, for instance, during the second time subinterval. It then stores the received data into allocated areas within its memory (Box 4). The program then determines whether the third subinterval has commenced (decision Box 5). Assuming that it has not, the program continues to determine whether an end of heat has occurred or an end of shift. If the answer is yes in either case, reports are generated for the aforestated period of operation. If not, the program (decision Box 16) FIG. 4B determines whether a screen change has been requested by the user on Display 26. In other words, in lieu of viewing a screen indicative of furnace status, the user may request a furnace "setup" status screen or a heat comparison screen etc. In such case, a new screen is generated and displayed (Box 17).

If no new screen has been requested, the program determines whether the first subinterval has commenced (decision Box 19). In such case, monitored data is accumulated (Box 18), and data is transferred to Display 26 to update a first portion of the screen then being displayed (Boxes 22, 24, 26, 27). In addition, the screen is updated to indicate any user entered keyboard data (Box 83). It will be hereinafter noted that Display 26 is updated during every subinterval to indicate keyboard entered data. This enables the user to rapidly see on the screen the results of keyboard entries without having to wait for a plurality of subintervals for keyboard updates.

Returning to decision Box 19, if it is determined that the program is in the second subinterval, the procedure is essentially the same as for the other branch of the program; the data transferred during the second subinterval is accumulated; a portion of Display 26 is updated; and keyboard entered data is indicated on the screen of display (Boxes 44-51, 83).

Returning to decision Box 5, if it is determined that the third subinterval has commenced, monitored data is accumulated (Boxes 28-65) and all system control calculations are preformed (Box 82). The program then determines whether an "event" has occurred. An event is a major action within arc furnace system 10, e.g. the addition of scrap steel to the furnace; the commencement of a melt cycle; an addition to one of the electrodes; a change of furnace state (from melt to refine), etc. Delays, such as, power demand, maintenance and production problems are also considered events and are handled in the same manner. If an event has occurred, a line is added to the Heat report indicating that fact. If no event has occurred, the Report is merely updated, as is Display 26 to indicate keyboard entries.

The following Tables 5-9 represent exemplary reports generated by microcomputer 22:

TABLE 5

| ** HEAT LOG ** Heat No.: 90001 | | | | | Date BOH: 08/24 Melter: 256 | | | Time: BOH: 08:38 First Helper: 112 | | |
|---|---|---|---|---|---|---|---|---|---|---|
| Clock Time | Time - minutes | | | TU % | Avg. MW | Tap/ Arc | Accum. MWHR | Charge Weight | EVENT/ DELAY | Min. to Charge |
| | Total | on | off | | | | | | | |
| 08:40 | 2.9 | 0.0 | 2.9 | 0 | 0.00 | | 0.00 | 42.1 | Fettle __ | 0.0 |
| 08:46 | 8.6 | 5.7 | 0.0 | 66 | 20.83 | 5 L | 1.98 | 0.0 | Bore-in __ | 7.8 |
| 08:47 | 9.2 | 0.0 | 0.6 | 61 | 0.00 | | 1.98 | 0.0 | Tap Change __ | 7.8 |
| 08:54 | 16.8 | 7.6 | 0.0 | 79 | 20.83 | 1 L | 4.62 | 0.0 | Header __ | 0.2 |
| 08:56 | 18.1 | 0.0 | 1.3 | 73 | 0.00 | | 4.62 | 48.5 | Recharge 1 __ | 0.2 |
| 09:01 | 23.0 | 4.9 | 0.0 | 79 | 20.83 | 3 L | 6.32 | 0.0 | Bore-in __ | 20.9 |
| 09:01 | 23.6 | 0.0 | 0.6 | 77 | 0.00 | | 6.32 | 0.0 | Tap Change __ | 20.9 |
| 09:22 | 44.2 | 20.6 | 0.0 | 87 | 20.83 | 1 L | 13.47 | 0.0 | Melt __ | 0.3 |
| 09:24 | 45.9 | 0.0 | 1.7 | 84 | 0.00 | | 13.47 | 19.6 | Recharge 2 __ | 0.3 |
| 09:27 | 48.4 | 2.5 | 0.0 | 85 | 20.83 | 3 L | 14.34 | 0.0 | Bore-in __ | 14.2 |
| 09:27 | 49.1 | 0.0 | 0.7 | 84 | 0.00 | | 14.34 | 0.0 | Tap Change __ | 14.2 |
| 09:33 | 54.6 | 5.5 | 0.0 | 85 | 20.83 | 1 L | 16.22 | 0.0 | Melt __ | 8.8 |
| 09:36 | 57.9 | 3.3 | 0.0 | 86 | 20.83 | 1 S | 17.40 | 0.0 | Melt __ | 5.4 |
| 09:37 | 58.6 | 0.0 | 0.7 | 85 | 0.00 | | 17.40 | 0.0 | Tap Change __ | 5.4 |

TABLE 5-continued

| | | | | | | | | | | |
|---|---|---|---|---|---|---|---|---|---|---|
| 09:38 | 59.8 | 1.2 | 0.0 | 85 | 20.83 | 3 L | 17.78 | 0.0 | 1st T 2200 F | 4.3 |
| 09:41 | 62.3 | 2.5 | 0.0 | 86 | 20.83 | 3 L | 18.68 | 0.0 | Refine __ | 1.7 |
| 09:41 | 63.0 | 0.0 | 0.7 | 85 | 0.00 | | 18.68 | 0.0 | __ | 1.7 |
| 09:43 | 64.7 | 1.7 | 0.0 | 85 | 20.83 | 3 S | 19.27 | 0.0 | Refine __ | 0.0 |
| 09:44 | 66.1 | 0.0 | 1.4 | 83 | 0.00 | | 19.27 | 0.0 | Tap T 2460 F | 0.0 |

TABLE 6

HEAT ELECTRICAL SUMMARY 
Heat No.: 90001    Time: 09:44:57

| Tap/ Arc | Power On Min. | Pct. | Avg. KV | Avg. MW | Avg. MVAR | Avg. MVA | Avg. P.F. | Arc Time Min. Floor | Ctr. | Pit | Secondary KA Floor | Ctr. | Pit | Avg. | XOP mOhm | S.F. Pct. |
|---|---|---|---|---|---|---|---|---|---|---|---|---|---|---|---|---|
| 1 L | 33.7 | 60.7 | 23.24 | 20.83 | 20.83 | 29.46 | 0.707 | 33.7 | 33.7 | 33.7 | 39.3 | 39.3 | 39.3 | 39.3 | 4.49 | 11.6 |
| 1 S | 3.3 | 5.9 | 23.24 | 20.83 | 20.83 | 29.46 | 0.707 | 3.7 | 3.3 | 3.3 | 39.3 | 39.3 | 39.3 | 39.3 | 4.49 | 11.6 |
| 3 L | 11.1 | 20.0 | 23.24 | 20.83 | 20.83 | 29.46 | 0.707 | 11.1 | 11.1 | 11.1 | 53.7 | 53.7 | 53.7 | 53.7 | 2.41 | 99.1 |
| 3 S | 1.7 | 3.1 | 23.24 | 20.83 | 20.83 | 29.46 | 0.707 | 1.7 | 1.7 | 1.7 | 53.7 | 53.7 | 53.7 | 53.7 | 2.41 | 99.1 |
| 5 L | 5.7 | 10.3 | 23.24 | 20.83 | 20.83 | 29.46 | 0.707 | 5.7 | 5.7 | 5.7 | 72.7 | 72.7 | 72.7 | 72.7 | 1.31 | 99.9 |
| | 55.5 | 100.0 | 23.24 | 20.83 | 20.83 | 29.46 | 0.707 | 55.5 | 55.5 | 55.5 | 47.3 | 47.3 | 47.3 | 47.3 | 3.10 | 40.9 |

TABLE 7

DAILY PRODUCTION SUMMARY 
Date: 24-AUG-89    Time: 09:45:52

| Heat No. | Tap Time | Time - Minutes Total | on | off | Tap to Pw. on | T.U. % | Ch'ge Tons | Tons/ Hr. | Accum. MWHR | KWHR/ ChTon | Total oxy. | Avg. MW | Avg. P.F. | Avg. KA |
|---|---|---|---|---|---|---|---|---|---|---|---|---|---|---|
| 90000 | 08:38 | 68.7 | 56.8 | 11.9 | 3.8 | 82.7 | 55.0 | 48.0 | 19.72 | 358.6 | 9310 | 20.83 | 0.707 | 46.8 |
| 90001 | 09:45 | 66.1 | 55.5 | 10.6 | 2.9 | 84.0 | 55.1 | 50.0 | 19.27 | 349.7 | 4750 | 20.83 | 0.707 | 47.3 |
| N = 2 | | 67.4 | 56.2 | 11.3 | 3.4 | 83.3 | 55.1 | 49.0 | 38.99 | 354.2 | 14060 | 20.83 | 0.707 | 47.0 |

TABLE 8

DAILY ELECTRICAL SUMMARY 
Date: 24-AUG-89    Time: 09:45:52

| Heat No. | Power On Min. | Pct. | Avg. KV | Avg. MW | Avg. MVAR | Avg. MVA | Avg. P.F. | Arc Time Min. Floor | Ctr. | Pit | Secondary KA Floor | Ctr. | Pit | Avg. | XOP mOhm |
|---|---|---|---|---|---|---|---|---|---|---|---|---|---|---|---|
| 90000 | 56.8 | 50.6 | 23.24 | 20.83 | 20.83 | 29.46 | 0.707 | 56.8 | 56.8 | 56.8 | 46.8 | 46.8 | 46.8 | 46.8 | 3.17 |
| 90001 | 55.5 | 49.4 | 23.24 | 20.83 | 20.83 | 29.46 | 0.707 | 55.5 | 55.5 | 55.5 | 47.3 | 47.3 | 47.3 | 47.3 | 3.10 |
| N = 2 | 56.2 | 100.0 | 23.24 | 20.83 | 20.83 | 29.46 | 0.707 | 112.3 | 112.3 | 112.3 | 47.0 | 47.0 | 47.0 | 47.0 | 3.14 |

DAILY EVENT SUMMARY 
Date: 24-AUG-89    Time: 09:45:52

| Heat: | 90000 | 90001 | Avg. |
|---|---|---|---|
| UNCLASSIFIED | 0.6 | 0.7 | 0.7 |
| Fettle __ | 0.0 | 2.9 | 1.5 |
| Header __ | 7.3 | 7.6 | 7.5 |
| Bore-in __ | 0.0 | 13.1 | 6.6 |
| Recharge 1 __ | 1.9 | 1.3 | 1.6 |
| Recharge 2 __ | 1.8 | 1.7 | 1.8 |
| Melt __ | 31.6 | 29.4 | 30.5 |
| Refine __ | 5.4 | 4.2 | 4.8 |
| 1st Temp. __ | 1.0 | 1.2 | 1.1 |
| Tapping __ | 1.1 | 1.4 | 1.3 |
| Tap Change __ | 0.0 | 2.6 | 1.3 |
| Total: | 50.7 | 66.1 | |

Referring now to the Tables 5-9, which are example reports generated by Microcomputer 22 to enable monitor and control of Arc Furnace System 10. In Table 5, a heat log is indicated. The system inserts a line into the log each time an "event" or "delay" occurs. An event may, as aforestated, be a change of state of the furnace, a delay created by a furnace problem, etc. As shown by the report of Table 5, at clock time 7:36 the first charge is added to the furnace. The charge which occurred 1.7 minutes into the heat had a weight of 100,000 pounds. The minutes to the next charge are calculated as 58.1 minutes.

The equation used to calculate the prediction of minutes to next charge is shown below:

$$\text{minutes to charge prediction} = \frac{(\text{Total Charge Weight} \times \text{KWH/Charge Ton Factor})}{\text{Avg Megawatts}} * \frac{(\text{MWHR Run Total} \times \text{Scaling Factor})}{\text{Avg Megawatts}}$$

The furnace's total charge weight is multiplied by the number of kilowatt hours required per charge-ton. A further multiplier is the number of total megawatt hours expended so far during the run and the final multiplier is a scaling factor. The product of the numerator is then divided by the average megawatts, thus giving the predicted number of minutes to the next charge.

Returning to Table 5, it can be seen that at clock time 16:02 the melt cycle begins while at time 16:04 a new electrode is added. The process continues until the cycle is completed and the steel is removed from the furnace, at which point, a heat report and electrical summary report are generated showing all of the events during the heat, as shown in FIGS. 5 and 6. Production, Electrical and Delay summary reports are then produced at the end of each shift, as outlined in Tables 7-9, which enable a supervisor to assess the efficiency of operation of the system. The screens and reports are designed to provide furnace operators with concise, non-technical, productivity information and electrical data, while documenting critical steel furnace operational information.

Another factor which has been developed in accordance with the present invention for controlling an arc furnace's operation is termed the Stability factor. That factor is calculated from the following expression:

$$\text{Stability Factor} = 200 - \frac{(\text{Operating Reactance})}{(\text{Short Circuit Reactance})} * 100$$

wherein:

$$\text{Operating Reactance} = \frac{\text{measured Megavars}}{3\,(\text{Electrode Current (calculated)})^2}$$

$$\text{Electrode Current (calculated)} = \frac{MVA}{3^{\frac{1}{2}} * V\text{primary}} * N$$

Short circuit reactance = Measured Furnace Constant

The short circuit reactance in the Stability Factor equation is a constant quantity based on the design factors for each furnace and is derived by submerging the electrodes in the liquid steel and then recording the various electrical parameters used in the following equation:

$$\text{Reactance (short circuit)} = \frac{\text{Megavars}}{.3 * \text{Current}^2 * N^2}$$

Where:
Megavars = measure primary reactive power;
Current = measured average
primary current
N = transformer voltage ratio During the operation of an arc furnace, after an initial charge of scrap steel, erratic arcing occurs between the graphite electrodes and the steel. As the scrap steel liquifies, the arcs become more continuous and a slag layer forms on top of the liquid steel. The slag layer prevents energy from being radiated to the sidewalls of the furnace and confines the arc ionization in tunnels in the slag layer. The reactive component (MVAR) of the electrical current tends to vary erratically during the initial period, and the stabilizes as teh arc's becomes steadier and the slag depth increases.

The direct measurement of electrode current in electric arc furnaces has been found to be somewhat inaccurate and misleading due to generated electrical noise, harmonic distortion of the signals and magnetic field effects. Therefore, accurate results of Operating Reactance and Stability Factor computations cannot be derived from the measured electrode current throughout the cycle.

However, it has been discovered that by calculating the current from the following measured quantities on the utility side of the furnace transformer; Megavars, Megawatts, and voltages, results in accurate numbers which agree with theoretical computations under sinusoidial or non-distorted electrical signal conditions. This is due to the effect that the furnace transformer acts as a filter of electrical and magnetic noise. Therefore, the measured electrical signals on the primary or utility side of the furnace transformer have less distortion and represent sinusoidial conditions more accurately. Also, the metering on the primary side of the furnace transformer has a much higher accuracy class than the secondary or electrode side of the furnace.

The following equation is used in calculating electrode current:

$$\text{Electrode current (calculated)} = \frac{MVA}{1.732 * V\text{primary}} * N$$

where:
MVA = (Megawatts$^2$ + Megavars$^2$ $^{\frac{1}{2}}$)
Vprimary = Average measured primary phase-to phase voltage
N = Furnace Transformer Voltage Ratio The Stability Factor may be used to control the furnace for both optimization of the electrical energy usage and maximizing the life of the furnace components. It is an indication of arc steadiness which is directly effected by the depth of the slag on the liquid steel. The steadier the arc, the higher the average power level and the greater the electrical efficiency. This is due to the arcs being submerged in the slag and the energy being directed into the steel bath rather than being radiated to the furnace walls. This also results in extending the life of the furnace components; such as refractory materials and furnace wall panels.

The optimum slag depth can be controlled by monitoring the Stability Factor. There is a balance point where by increasing the depth of the slag improves the furnace operating efficiency until a plateau is reached. At this point the Stability Factor (S.F.) percentage reaches a peak value. This value is a function of the furnace design, type of steel, and type of slag produced and changes for each point of the operating cycle. During the melting period, the S.F. is at a relatively low percentage, below 50% for example. During the refining period after the steel scrap has melted and is liquid, the S.F. increases to approximately 75%. A foamy slag period follows as the slag depth is increased, by the addition of oxygen and coal, the S.F. reaches an optimum point. The S.F. may peak at 85%, for example. At this time, the oxygen and coal injection systems are shut off to conserve on raw materials and stabilize the slag. If by change the electrodes are submerged into the liquid steel, which short circuits the arcs, the S.F would indicate 100%. The submersion of the electrodes is not a recommended nor desirable practice since it will alter the steel chemistry and should rarely occur. Therefore, the stability factor is an excellent control parameter for maintaining maximum furnace performance while lowering operating costs. The optimum level for the Stability Factor can be preestablished by earlier melts to provide an historical basis for controlling the operation at a given optimum level.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for on-line monitoring and control of an electric arc furnace in the manufacture of steel using a data processing system for providing control information to control the electric arc furnace comprising the steps of:

(a) monitoring electrical data from the arc furnace representative of the electrical conditions and electrical power delivered to the furnace;
(b) calculating a Stability Factor (SF) from said electrical data in accordance with the following algorithm:

$$\text{Stability Factor} = 200 - \frac{\text{Operating Reactance} * 100}{\text{Short Circuit Reactance}}$$

Where:

$$\text{Operating Reactance} = \frac{\text{measured } Megavars}{3 * [\text{Electrode Current (calculated)}]^2}$$

$$\text{Electrode Current (calculated)} = \frac{MVA * N}{3^{\frac{1}{2}} * V\text{primary}}$$

Short Circuit Reactance = Constant which is derived by submerging the electrodes into the liquid steel bath and performing the following calculation:

$$\text{Reactance (at short circuit)} = \frac{Megavars}{3 * \text{Current}^2 * N^2}$$

Where:
Megvars = measured primary reactive power;
Current = measured average primary current
N = transformer voltage ratio (c) comparing said calculated Stability Factor with a pre-established Stability Factor for said arc furnace corresponding to a given period of furnace operation; and
(d) introducing raw material into the furnace when the calculated Stability Factor is below the pre-established level for said period of furnace operation to raise the Stability Factor to said pre-established level.

2. A method for on-line monitoring and control of the performance of an electric arc furnace in which an electric arc is established between a plurality of graphite electrodes and a charge of metal in the manufacture of steel, with power to the furnace supplied from a power supply having a three phase transformer for melting and refining said charge under conditions in which a foamy slag is formed above the liquified metal during the period of metal refining, comprising the steps of:

(a) monitoring electrical data from the arc furnace representative of the electrical conditions and electrical power delivered to the furnace;
(b) measuring the primary reactive power on the primary side of said three phase transformer;
(c) calculating a Stability Factor (SF) from said electrical data in accordance with the following algorithm:

$$\text{Stability Factor} = 200 - \frac{\text{Operating Reactance} * 100}{\text{Short Circuit Reactance}}$$

Where:

$$\text{Operating Reactance} = \frac{\text{measured Megavars}}{3 * [\text{Electrode Current (calculated)}]^2}$$

$$\text{Electrode Current (calculated)} = \frac{MVA * N}{3^{\frac{1}{2}} * V\text{primary}}$$

Short Circuit Reactance = Constant which is derived by submerging the electrodes into the liquid steel bath and performing the following calculation:

$$\text{Reactance (at short circuit)} = \frac{Megavars}{3 * \text{Current}^2 * N^2}$$

Where:
Megavars = measured primary reactive power;
Current = measured average primary current
N = transformer voltage ratio (d) periodically compiling a report of furnace conditions wherein one entry in said report is said Stability Factor;
(e) monitoring said Stability Factor; and
(f) varying said foamy slag in said furnace in response to the monitored level of said Stability Factor.

3. A method as defined in claim 2 wherein said foamy slag is varied by the addition of oxygen and/or coke.

* * * * *

UNITED STATES PATENT AND TRADEMARK OFFICE
CERTIFICATE OF CORRECTION

PATENT NO. : 5,099,438
DATED : March 24, 1992
INVENTOR(S) : George Gulden, Jr. and Kenneth W. Penkal It is certified that error appears in the above-indentified patent and that said Letters Patent is hereby corrected as shown below:

Column 7, line 42, above the table of "DAILY EVENT SUMMARY", insert --TABLE 9--.

Column 9, line 12, "wherein:" should read --where:--.

Column 9, line 47, "the stabilizes as teh" should read --then stabilizes as the--.

Signed and Sealed this

Twenty-eighth Day of December, 1993

Attest:

BRUCE LEHMAN

Attesting Officer  Commissioner of Patents and Trademarks